United States Patent
Caruso et al.

(10) Patent No.: US 10,060,411 B2
(45) Date of Patent: Aug. 28, 2018

(54) ROTOR BLADE ROOT ASSEMBLY FOR A WIND TURBINE

(71) Applicant: General Electric Company, Schenectady, NY (US)

(72) Inventors: Christopher Daniel Caruso, Greenville, SC (US); Aaron A. Yarbrough, Greenville, SC (US); Daniel Alan Hynum, Simpsonville, SC (US); James Robert Tobin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 284 days.

(21) Appl. No.: 14/805,860

(22) Filed: Jul. 22, 2015

(65) Prior Publication Data
US 2017/0022968 A1    Jan. 26, 2017

(51) Int. Cl.
*F03D 1/06* (2006.01)
*B29C 65/00* (2006.01)

(52) U.S. Cl.
CPC ........ *F03D 1/0675* (2013.01); *B29C 66/7392* (2013.01); *B29C 66/7394* (2013.01); *F03D 1/0658* (2013.01); *F05D 2300/42* (2013.01); *F05D 2300/433* (2013.01); *F05D 2300/436* (2013.01); *F05D 2300/603* (2013.01); *Y02E 10/721* (2013.01); *Y02P 70/523* (2015.11)

(58) Field of Classification Search
CPC .............................. B29C 65/02; F03D 1/0658
See application file for complete search history.

(56) References Cited

U.S. PATENT DOCUMENTS

| | | | |
|---|---|---|---|
| 4,360,288 A | 11/1982 | Rutledge, Jr. et al. | |
| 4,420,354 A | 12/1983 | Gougeon et al. | |
| 4,915,590 A | 4/1990 | Eckland et al. | |
| 5,660,527 A | 8/1997 | Deering et al. | |
| 6,264,877 B1 | 7/2001 | Pallu De La Barriere | |
| 7,163,378 B2 * | 1/2007 | Kildegaard | B29C 70/525 416/230 |

(Continued)

FOREIGN PATENT DOCUMENTS

| CN | 101906251 A | 12/2010 |
|---|---|---|
| CN | 202431459 U | 9/2012 |

(Continued)

OTHER PUBLICATIONS

English translation of CN 101906251.*

(Continued)

*Primary Examiner* — Ninh H Nguyen
*Assistant Examiner* — Topaz L Elliott
(74) *Attorney, Agent, or Firm* — Dority & Manning, P.A.

(57) ABSTRACT

A root assembly for a rotor blade of a wind turbine includes a blade root section having an inner sidewall surface and an outer sidewall surface separated by a radial gap, a plurality of root inserts spaced circumferentially within the radial gap, and a plurality of spacers configured between one or more of the root inserts. Further, each of the root inserts includes at least one bore hole surrounded by a pre-cured or pre-consolidated composite material. In addition, the pultruded spacers are constructed of a pre-cured or pre-consolidated composite material.

16 Claims, 14 Drawing Sheets

(56) References Cited

U.S. PATENT DOCUMENTS

| | | | |
|---|---|---|---|
| 7,530,168 B2* | 5/2009 | Sorensen | B29C 70/86 29/889.21 |
| 7,686,905 B2 | 3/2010 | Ackerman et al. | |
| 7,966,726 B2 | 6/2011 | Schibsbye | |
| 8,092,187 B2* | 1/2012 | Bell | F03D 1/06 29/889.7 |
| 8,100,660 B2 | 1/2012 | Vronsky et al. | |
| 8,105,040 B2 | 1/2012 | Vronsky et al. | |
| 8,172,538 B2 | 5/2012 | Hancock et al. | |
| 8,206,107 B2* | 6/2012 | Dawson | F03D 1/0675 416/223 R |
| 8,317,479 B2 | 11/2012 | Vronsky et al. | |
| 8,545,182 B2 | 10/2013 | Sorensen | |
| 8,657,581 B2 | 2/2014 | Pilpel et al. | |
| 8,673,106 B1 | 3/2014 | Jolley et al. | |
| 8,747,098 B1 | 6/2014 | Johnson et al. | |
| 8,961,142 B2 | 2/2015 | Wansink | |
| 8,992,813 B2 | 3/2015 | Robbins et al. | |
| 9,234,497 B2* | 1/2016 | Grove-Nielsen | F03D 1/001 |
| 9,546,716 B2 | 1/2017 | Arndt et al. | |
| 2008/0273981 A1* | 11/2008 | Ito | F03D 1/0658 416/219 R |
| 2009/0148300 A1 | 6/2009 | Driver et al. | |
| 2009/0246033 A1 | 10/2009 | Rudling | |
| 2009/0324420 A1 | 12/2009 | Arocena De La Rua et al. | |
| 2010/0084079 A1 | 4/2010 | Hayden et al. | |
| 2010/0171317 A1 | 7/2010 | Trede | |
| 2011/0044817 A1 | 2/2011 | Bendel et al. | |
| 2011/0045275 A1* | 2/2011 | Tadepalli | C07F 7/1836 428/300.1 |
| 2012/0315143 A1 | 12/2012 | Grove-Nielsen | |
| 2012/0315145 A1 | 12/2012 | Grove-Nielsen | |
| 2013/0078105 A1 | 3/2013 | Drewes et al. | |
| 2013/0108464 A1 | 5/2013 | McEwen et al. | |
| 2013/0164133 A1 | 6/2013 | Grove-Nielsen | |
| 2013/0177428 A1 | 7/2013 | Zeller et al. | |
| 2013/0209257 A1 | 8/2013 | Feigl | |
| 2013/0209263 A1 | 8/2013 | Feigl | |
| 2013/0285284 A1* | 10/2013 | Moeller Larsen | B29C 70/46 264/257 |
| 2013/0330197 A1 | 12/2013 | Feigl | |
| 2014/0023511 A1 | 1/2014 | Lund | |
| 2014/0030095 A1 | 1/2014 | Dahl | |
| 2014/0030096 A1* | 1/2014 | Dahl | B29C 70/86 416/217 |
| 2014/0030097 A1 | 1/2014 | Dahl et al. | |
| 2014/0127028 A1 | 5/2014 | Feigl et al. | |
| 2014/0140652 A1 | 5/2014 | Jacobsen | |
| 2014/0271190 A1 | 9/2014 | Hansen | |
| 2014/0295187 A1 | 10/2014 | Jacobsen et al. | |
| 2015/0023799 A1 | 1/2015 | Wetzel et al. | |
| 2015/0165700 A1 | 6/2015 | Thorning et al. | |
| 2015/0167642 A1 | 6/2015 | Hansen | |
| 2015/0354541 A1* | 12/2015 | Grove-Nielsen | F03D 11/0008 416/228 |
| 2015/0361950 A1 | 12/2015 | Pipo Benito | |
| 2016/0046107 A1 | 2/2016 | Zhang et al. | |
| 2016/0047355 A1* | 2/2016 | Feigl | F03D 1/0658 416/229 A |
| 2016/0053741 A1 | 2/2016 | Sabbadin | |
| 2016/0312762 A1* | 10/2016 | Quiring | B29C 70/34 |

FOREIGN PATENT DOCUMENTS

| | | |
|---|---|---|
| CN | 202597411 U | 12/2012 |
| CN | 103061995 A | 4/2013 |
| CN | 102177337 | 11/2013 |
| CN | 203374434 U | 1/2014 |
| DE | 19625426 | 1/1998 |
| DE | 10 2011 051 172 | 12/2012 |
| EP | 1878915 | 1/2008 |
| EP | 1956235 A1 | 8/2008 |
| EP | 2551512 | 1/2013 |
| EP | 2589796 A1 | 5/2013 |
| EP | 2 677 170 | 12/2013 |
| EP | 2682256 | 1/2014 |
| FR | 2863321 A1 | 6/2005 |
| GB | 2191249 | 12/1987 |
| JP | 1145985 | 10/1990 |
| JP | 2122179 | 10/1990 |
| JP | 4006574 | 1/1992 |
| JP | 4103263 | 9/1992 |
| JP | H08270540 A | 10/1996 |
| JP | 3047470 | 4/1998 |
| JP | H11182408 A | 7/1999 |
| JP | 3015669 B2 | 3/2000 |
| JP | 2003293935 A | 10/2003 |
| JP | 2007092716 A | 4/2007 |
| JP | 2007132295 A | 5/2007 |
| WO | WO 03/082551 A1 | 10/2003 |
| WO | WO 2010/018225 | 2/2010 |
| WO | WO 2010/025830 A2 | 3/2010 |
| WO | 2011035548 A1 | 3/2011 |
| WO | WO 2011/088835 A2 | 7/2011 |
| WO | WO 2011/098785 A2 | 8/2011 |
| WO | WO 2012/140039 A2 | 10/2012 |
| WO | WO 2012/140048 | 10/2012 |
| WO | WO 2012/172132 | 12/2012 |
| WO | WO 2013/190140 | 12/2013 |
| WO | WO 2014/108591 | 7/2014 |
| WO | WO 2014/147201 | 9/2014 |
| WO | WO 2014/155293 | 10/2014 |
| WO | WO 2014/191046 | 12/2014 |
| WO | WO 2015/015202 A1 | 2/2015 |

OTHER PUBLICATIONS

"Thermoset Urethane vs. Thermoplastic Urethane" retrieved on Dec. 11, 2017 from https://psiurethanes.com/urethane-resources/thermoset-vs-thermoplastic/.*

European Search Report and Opinion issued in connection with corresponding EP Application No. 16179719.6 dated Nov. 23, 2016.

* cited by examiner

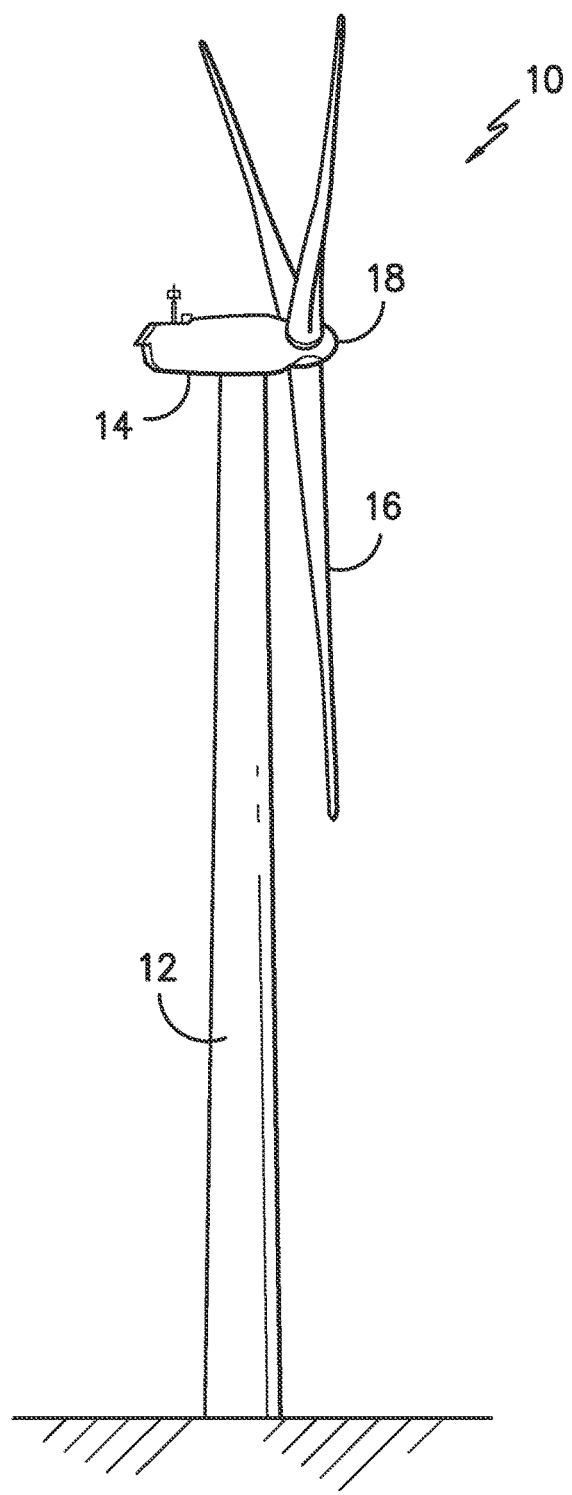
FIG. -1-

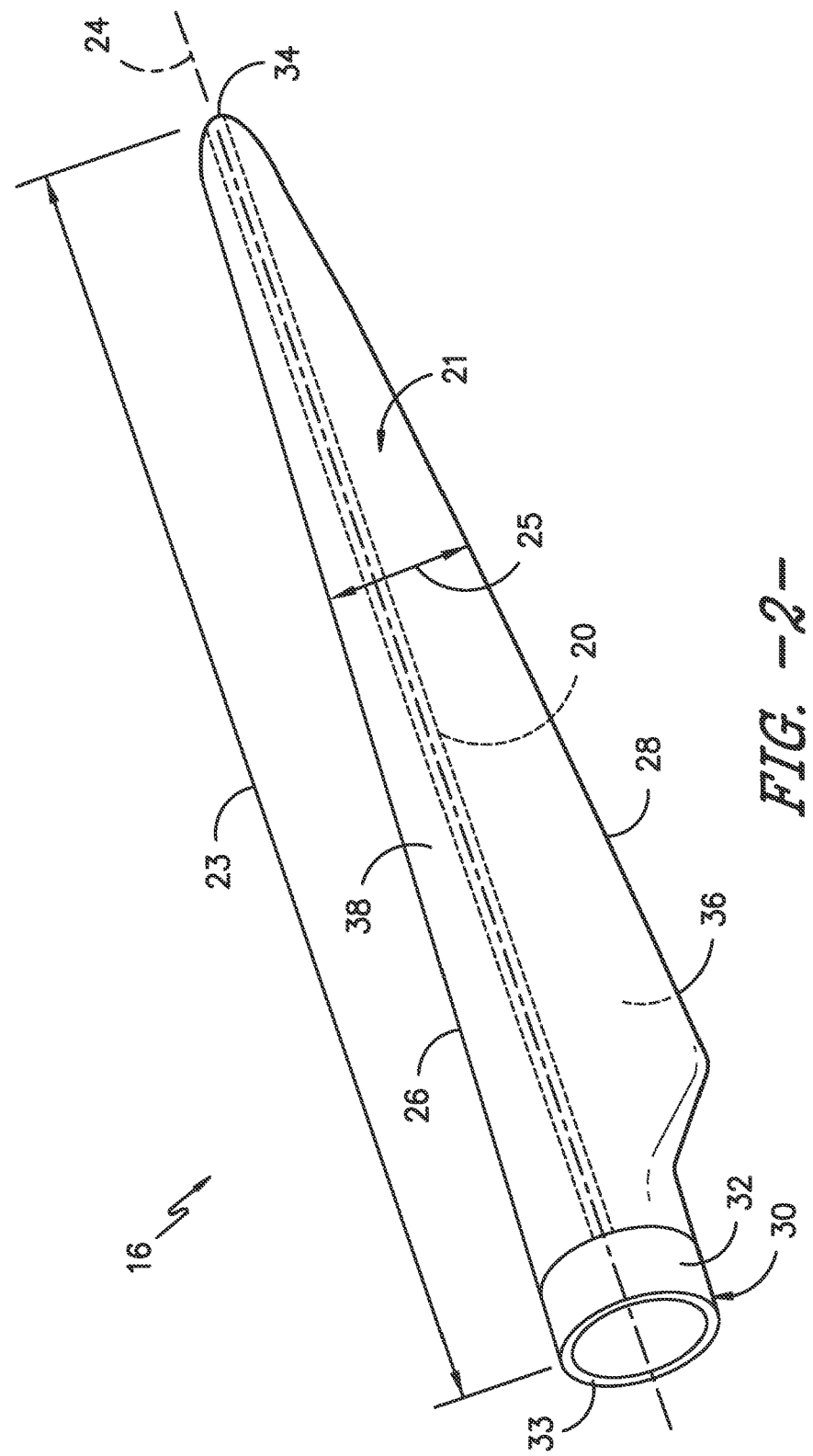

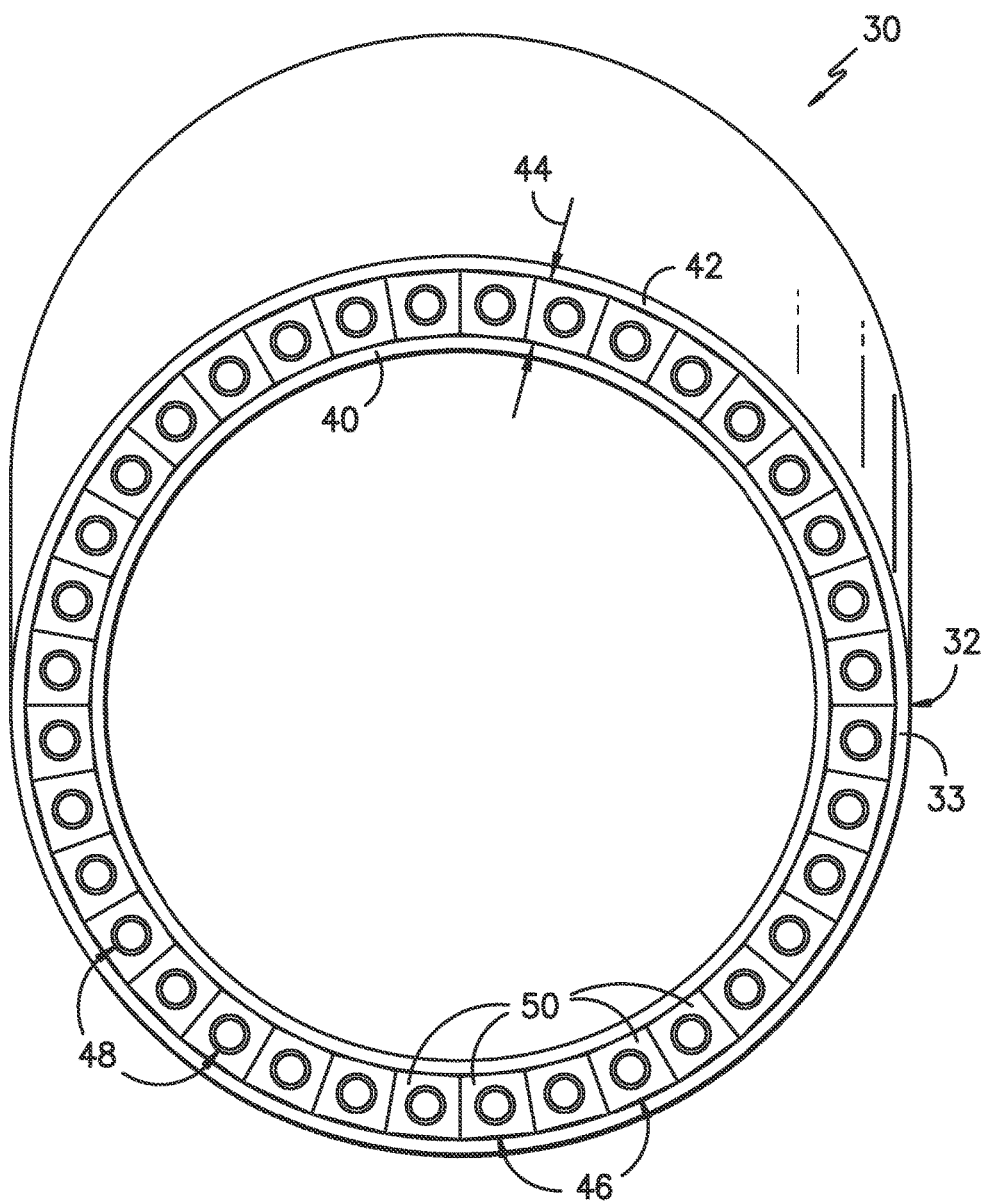
FIG. -3-

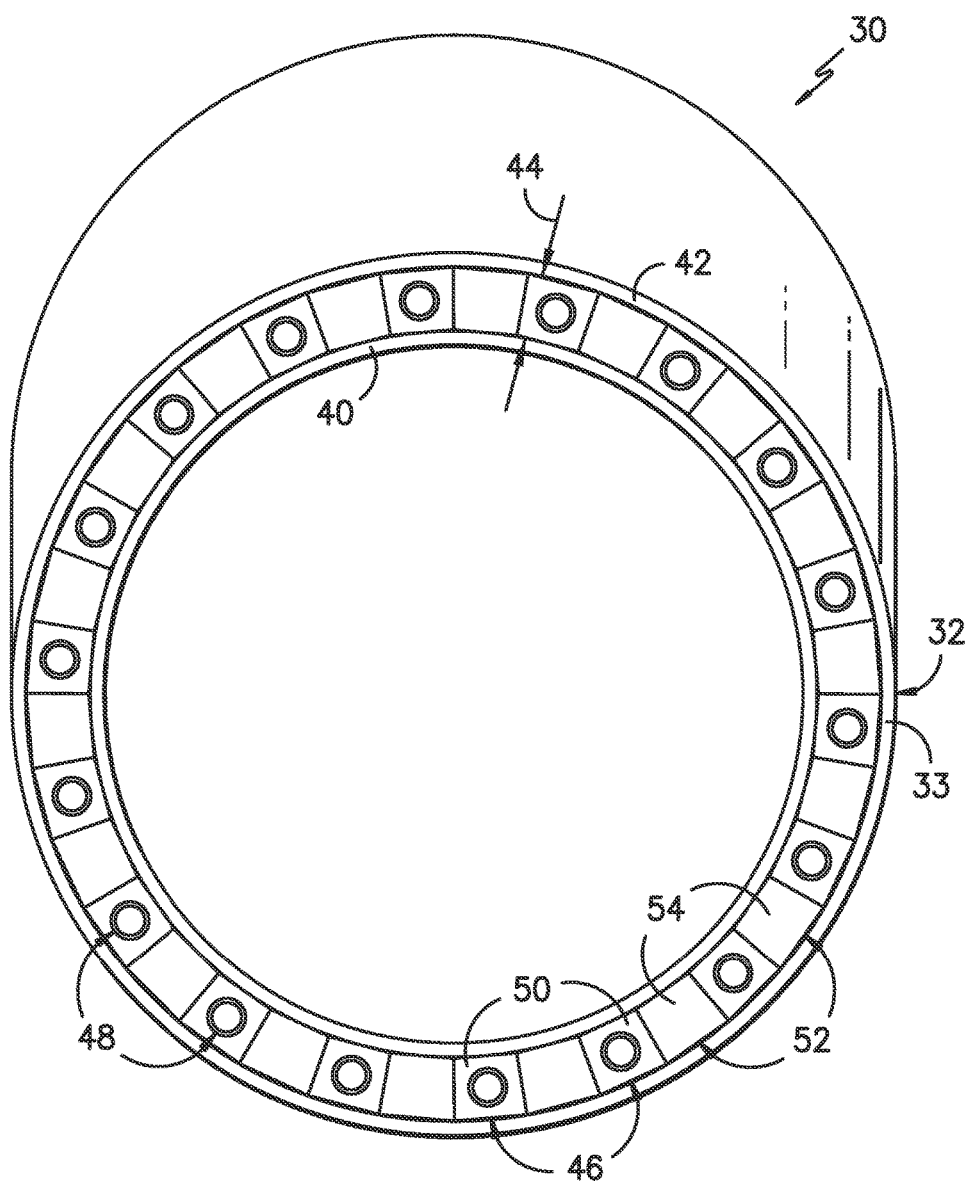
FIG. -4-

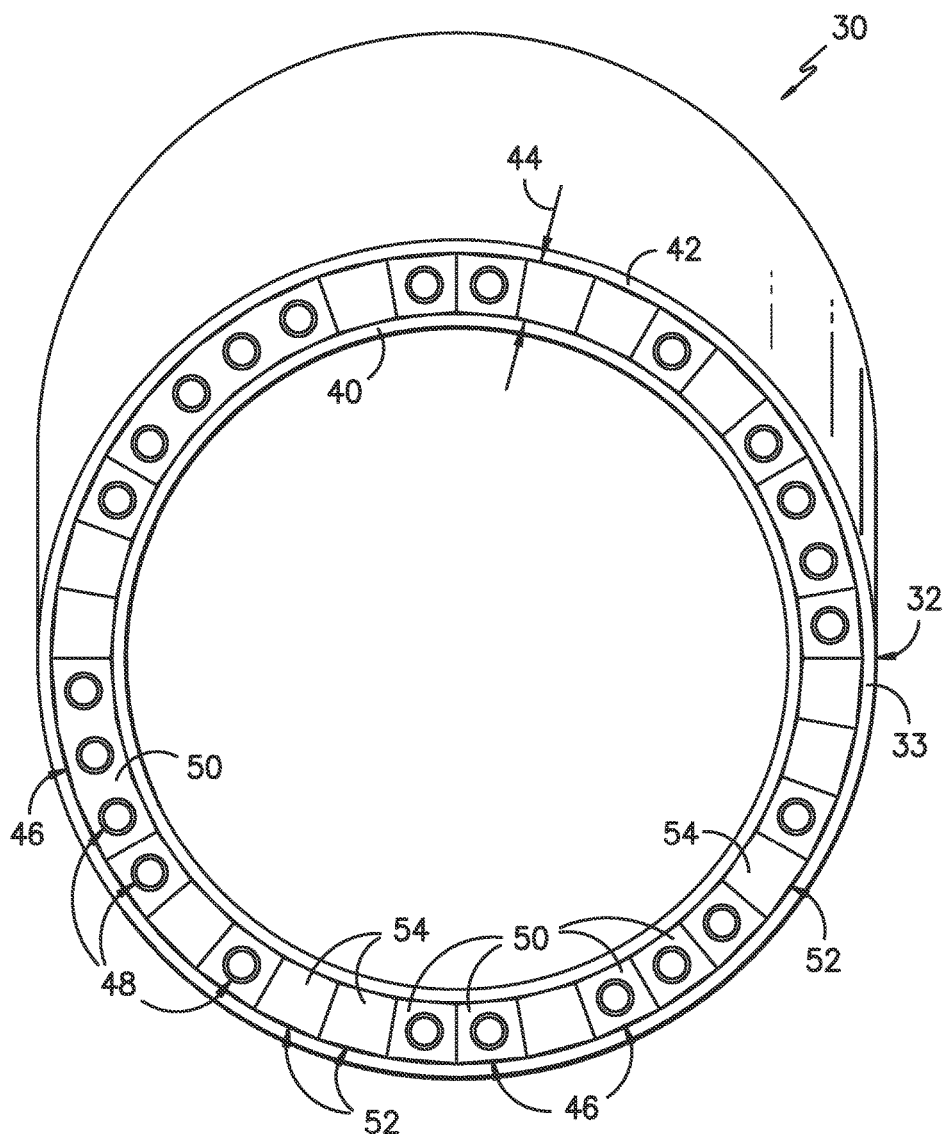
FIG. -5-

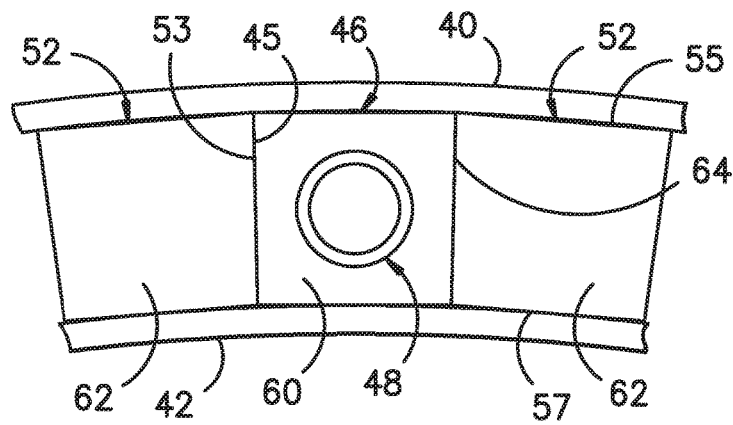
FIG. -6-
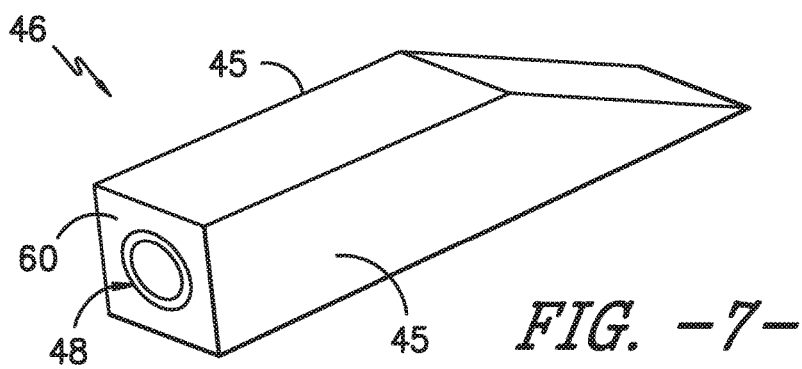
FIG. -7-
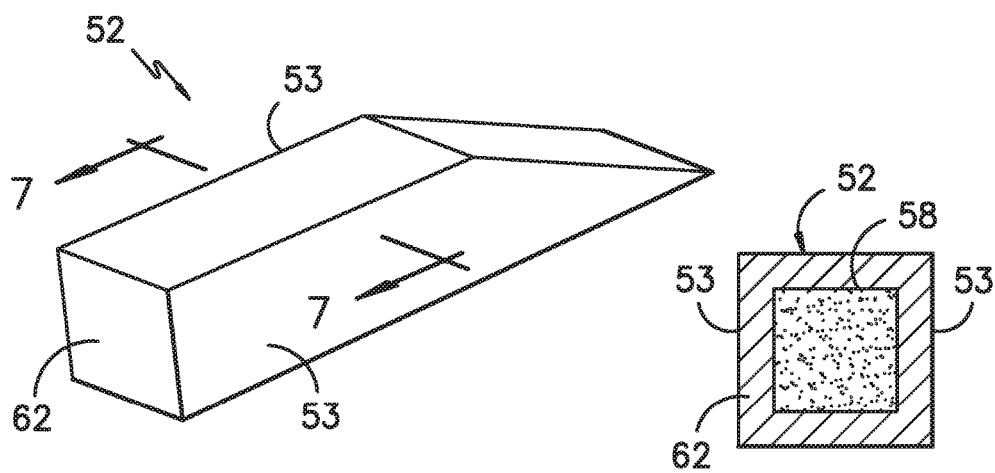
FIG. -8-
FIG. -9-

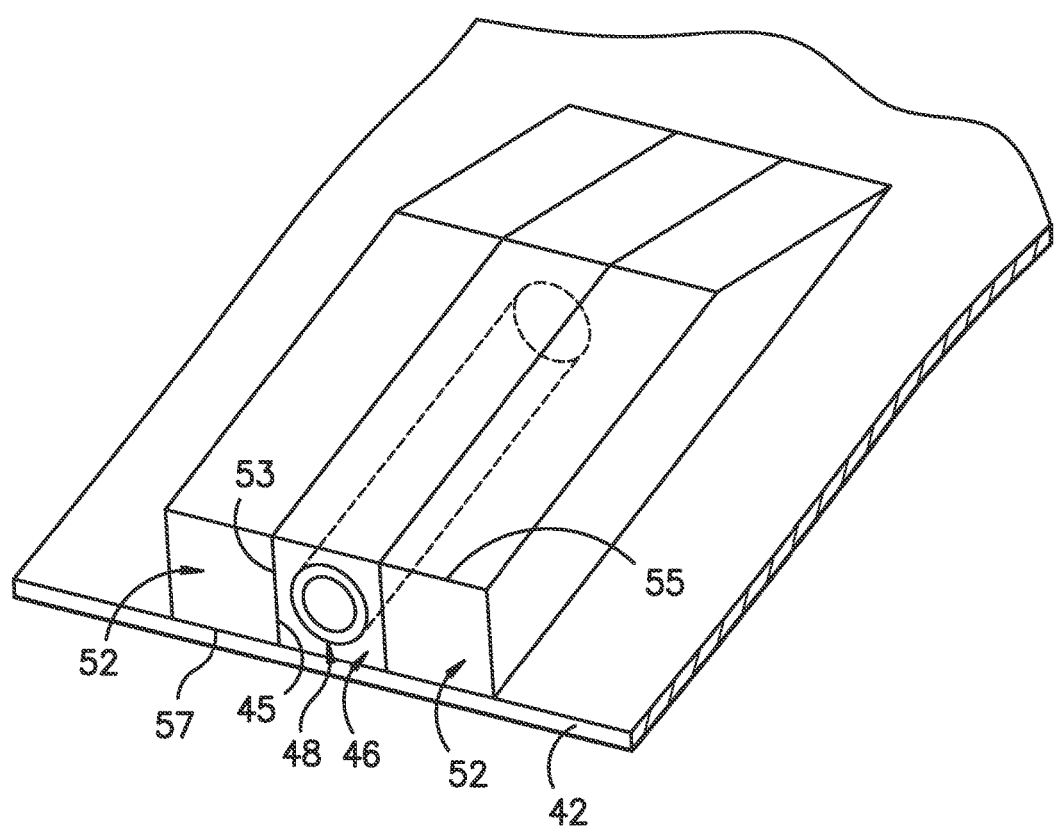
FIG. -10-

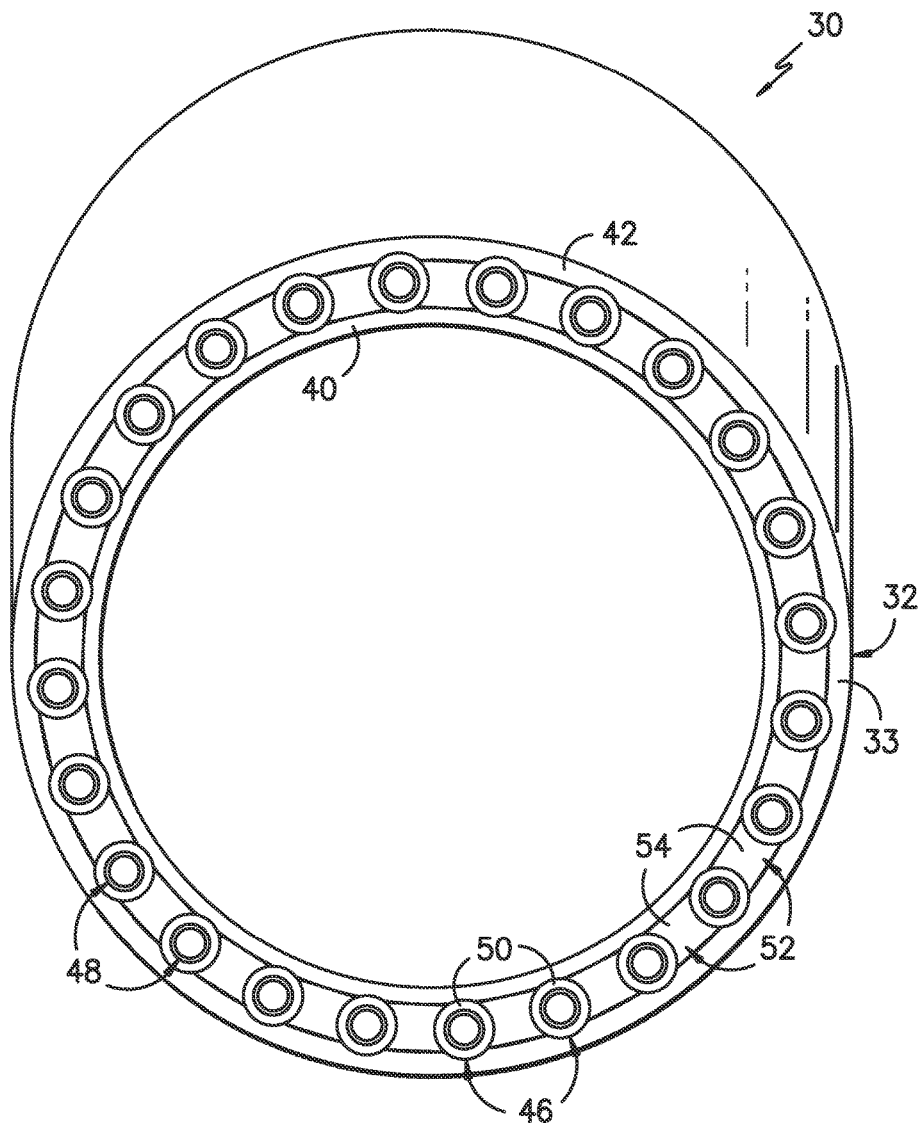
FIG. -11-

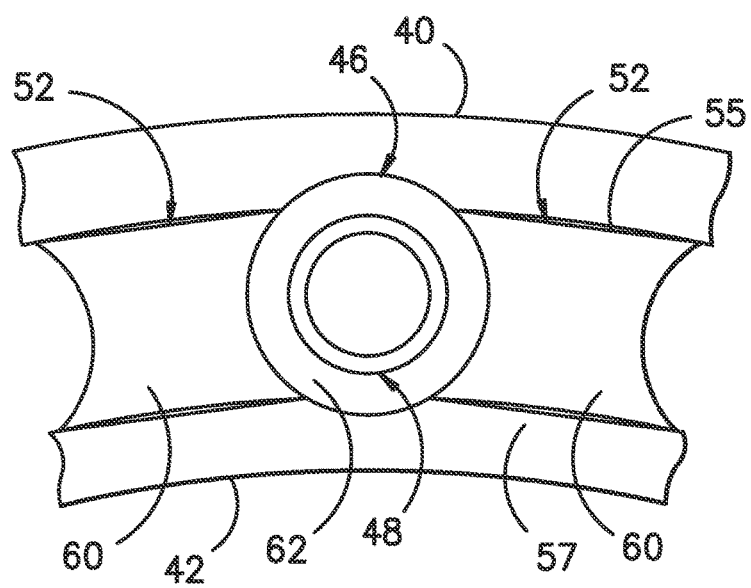
FIG. -12-
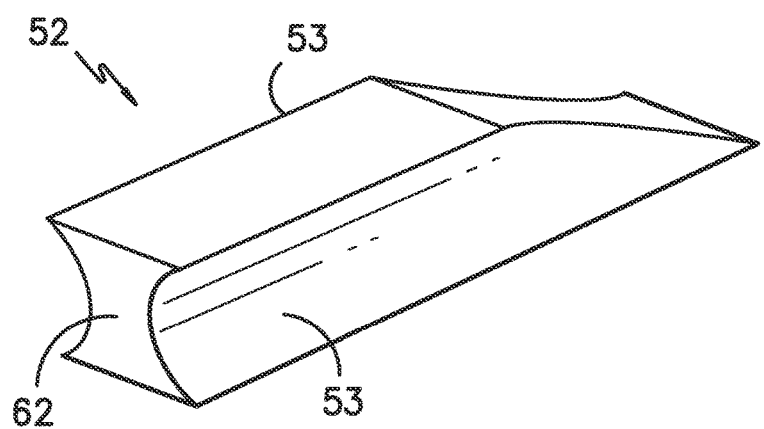
FIG. -13-

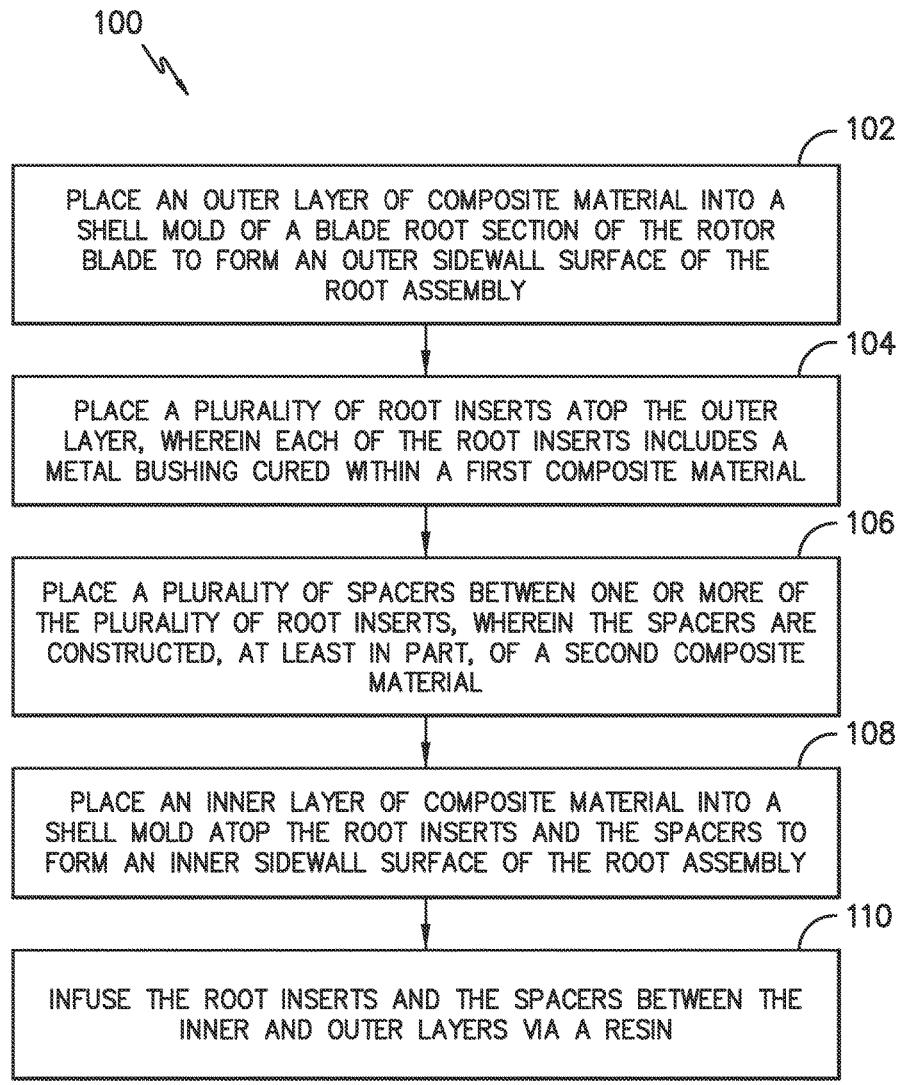
FIG. -14-

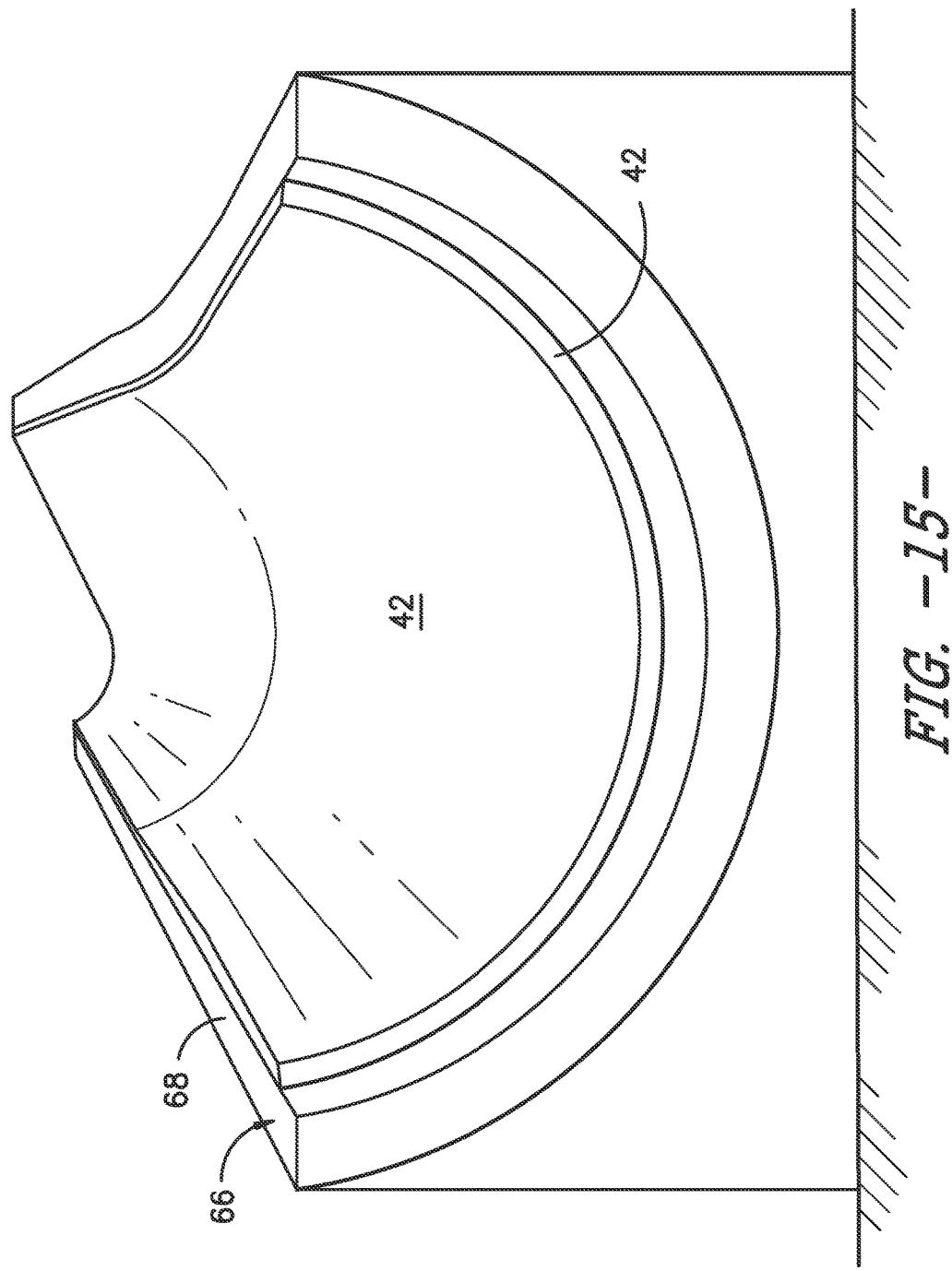

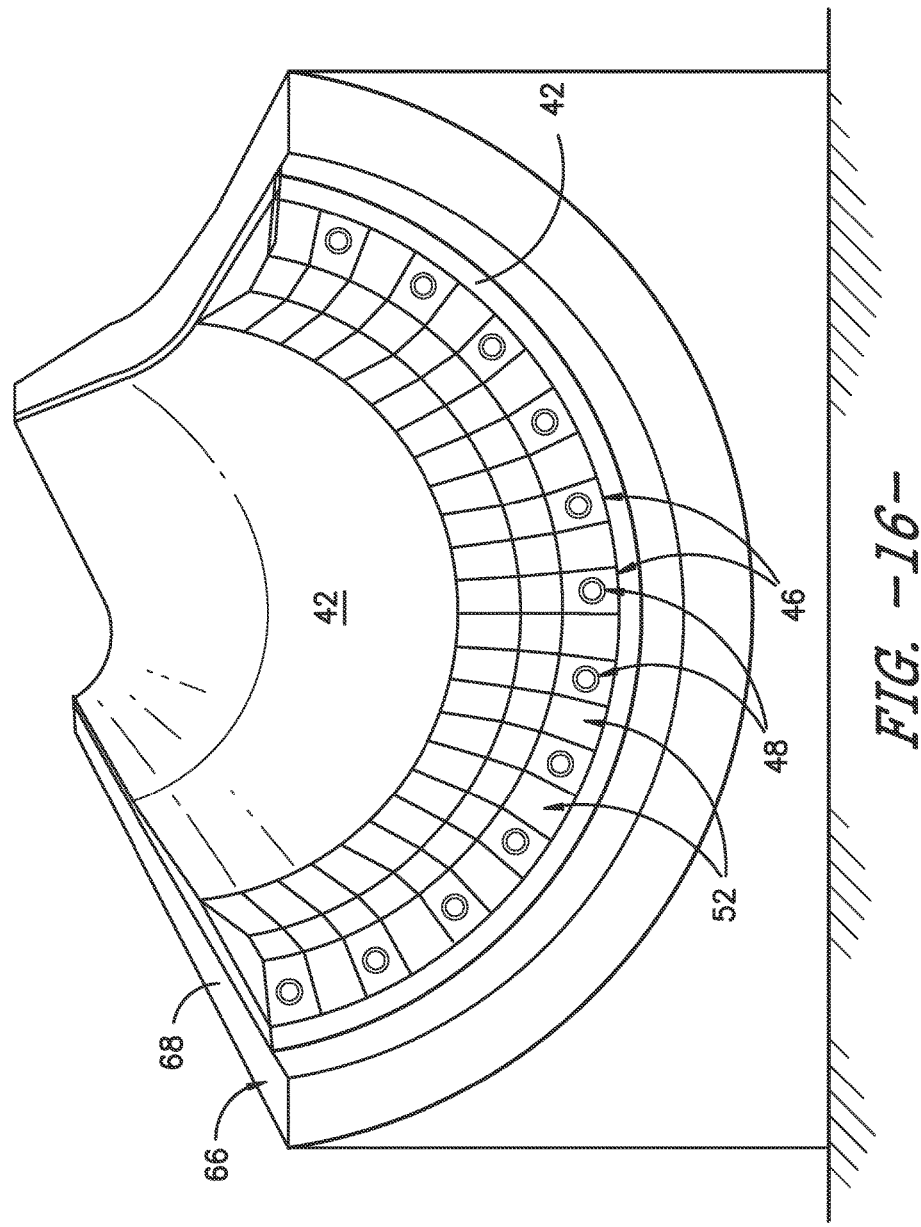
FIG. -16-

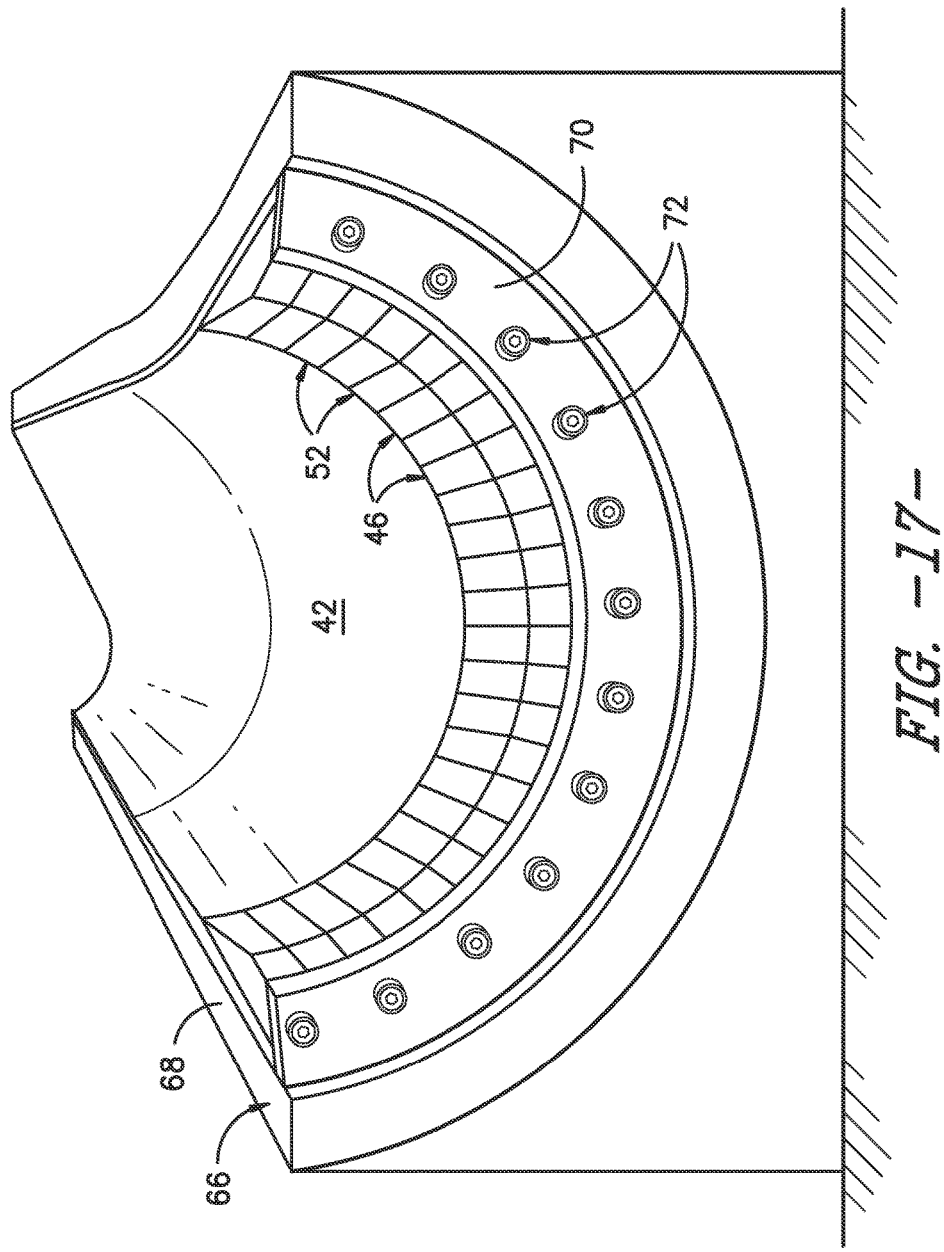
FIG. -17-

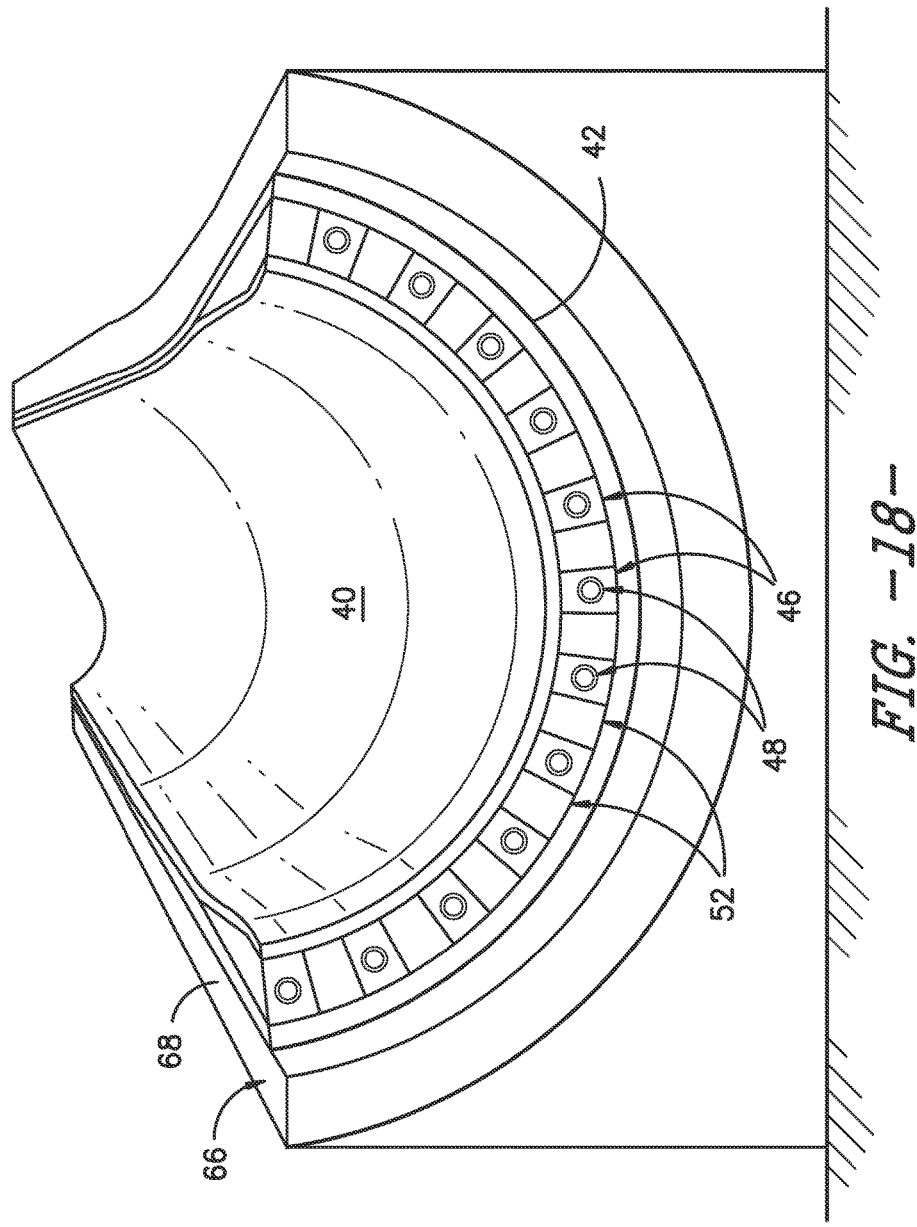
FIG. -18-

ROTOR BLADE ROOT ASSEMBLY FOR A WIND TURBINE

FIELD OF THE INVENTION

The present subject matter relates generally to wind turbines and, more particularly, to a rotor blade root assembly for a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor is coupled to the nacelle and includes a rotatable hub having one or more rotor blades. The rotor blades are connected to the hub by a blade root. The rotor blades capture kinetic energy from wind using known airfoil principles and convert the kinetic energy into mechanical energy through rotational energy to turn a shaft coupling the rotor blades to a gearbox, or if a gearbox is not used, directly to the generator. The generator then converts the mechanical energy to electrical energy that may be deployed to a utility grid.

The particular size of the rotor blades is a significant factor contributing to the overall capacity of the wind turbine. Specifically, increases in the length or span of a rotor blade may generally lead to an overall increase in the energy production of a wind turbine. Accordingly, efforts to increase the size of rotor blades aid in the continuing growth of wind turbine technology and the adoption of wind energy as an alternative and commercially competitive energy source. Such increases in rotor blade size, however, may impose increased loads on various wind turbine components. For example, larger rotor blades may experience increased stresses at the connection between the blade root and the hub, leading to challenging design constraints, both characterized by extreme events and fatigue life requirements.

Many rotor blades utilize root bolt inserts to reduce the stresses at the blade root-hub interface. Such root bolt inserts can be produced using a variety of processes, including but not limited to pultrusions. A common approach is to infuse root bolt inserts with fabrics and rovings to provide a laminate substrate by which later infusions can be used to effectively bond the insert into the blade root laminates. Round, square, trapezoidal, or similar profiles may be used, though the number of root bolt inserts required often leaves a gap between inserts that must be filled with a mixture of glass and resin. This process entails cutting very small strips of glass and placing the strips manually in the blade root and then using a typical vacuum infusion process. Such a process can be labor-intensive and often results in poor laminate quality of the laminates between the root bolt inserts.

Thus, there is a need for an improved rotor blade root assembly that addresses the aforementioned issues. Accordingly, a rotor blade root assembly that reduces labor cycle time and improves laminate quality would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the invention, a root assembly for a rotor blade of a wind turbine is disclosed. The root assembly includes a blade root section and a plurality of root inserts. The blade root section has an inner sidewall surface and an outer sidewall surface separated by a radial gap. Further, the blade root section is constructed of a first composite material. More specifically, the first composite material includes a thermoplastic material or a thermoset material. The root inserts are spaced circumferentially within the radial gap. Further, each of the root inserts includes at least one bore hole surrounded by a second composite material. The second composite material includes a thermoplastic material or a thermoset material; however, the second composite material is different than the first composite material. In other words, the resin system of the blade root section is the opposite of the root inserts. In addition, each of the bore holes is configured to receive a root bolt that secures the root assembly to a hub of the wind turbine.

More specifically, in one embodiment, the first composite material may include the thermoset material, whereas the second composite material may include the thermoplastic material. Alternatively, in another embodiment, the first composite material may include the thermoplastic material, whereas the second composite material may include the thermoset material.

In further embodiments, the thermoplastic material may include at least one of polyvinyl chlorides (PVC), polyvinylidene chlorides, polyvinyl acetates, polypropylenes, polyethylenes, polystyrenes, polyurethanes, polyphenyl sulfide, polybutylene terephthalate (PBT), polyamides, polymethyl methacrylate (PMMA), polyethylene terephthalate (PET), glycolised polyethylene terephthalate (PET-G), or similar. In additional embodiments, the thermoset material may include at least one of polyester, ester, epoxy, melamine formaldehyde, urea formaldehyde, or similar.

In yet another embodiment, the root assembly may also include a plurality of spacers configured between one or more of the root inserts. More specifically, each of the spacers may be constructed of a pre-cured or pre-consolidated composite material, e.g. a thermoplastic material or thermoset material as described herein.

In addition, in certain embodiments, the thermoset material and/or the thermoplastic material described herein may be reinforced with one or more fibers. For example, the fiber(s) may include carbon fibers, carbon rovings, glass fibers, or glass rovings, or similar.

Further, in additional embodiments, the root assembly may further include a bonding agent configured within the radial gap. More specifically, in certain embodiments, the bonding agent may include chopped fiber mat (CFM), a biaxially-stretched plastic film, a three-dimensional glass fabric, or similar.

In further embodiments, the root assembly may be formed via at least one of welding, vacuum infusion, resin transfer molding (RTM), light resin transfer molding (RTM), vacuum assisted resin transfer molding (VARTM), or similar.

In another aspect, the present disclosure is directed to a root assembly for a rotor blade of a wind turbine. The root assembly includes a blade root section and a plurality of root inserts. The blade root section includes an inner sidewall surface and an outer sidewall surface. The inner and outer sidewall surfaces are separated by a radial gap. Further, the blade root section is constructed, at least in part, of a thermoplastic material. The root inserts are spaced circumferentially within the radial gap. In addition, each of the root inserts includes at least one bore hole surrounded by a thermoplastic material. Further, each of the bore holes is configured to receive a root bolt to secure the root assembly to a hub of the wind turbine. It should be understood that the root assembly may be further configured with any of the additional features as described herein.

In yet another aspect, the present disclosure is directed to a root assembly for a rotor blade of a wind turbine. The root assembly includes a blade root section and a plurality of root inserts. The blade root section includes an inner sidewall surface and an outer sidewall surface. The inner and outer sidewall surfaces re separated by a radial gap. Further, the blade root section is constructed of at least one thermoset material and at least one thermoset material. The root inserts are spaced circumferentially within the radial gap. In addition, each of the root inserts includes at least one bore hole surrounded by a thermoset material or a thermoplastic material. Further, each of the bore holes is configured to receive a root bolt to secure the root assembly to a hub of the wind turbine. It should be understood that the root assembly may be further configured with any of the additional features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a rotor blade of a wind turbine according to the present disclosure;

FIG. 3 illustrates an enlarged view of one embodiment of an end face of a root assembly of a rotor blade according to the present invention;

FIG. 4 illustrates an enlarged view of another embodiment of an end face of a root assembly of a rotor blade according to the present invention;

FIG. 5 illustrates an enlarged view of yet another embodiment of an end face of a root assembly of a rotor blade according to the present invention;

FIG. 6 illustrates a detailed view of a portion of a root assembly of a wind turbine rotor blade according to the present disclosure;

FIG. 7 illustrates a perspective view of one embodiment of a root insert for a root assembly of a wind turbine rotor blade according to the present disclosure;

FIG. 8 illustrates a perspective view of one embodiment of a spacer for a root assembly of a wind turbine rotor blade according to the present disclosure;

FIG. 9 illustrates a cross-sectional view of the spacer of FIG. 6 along line 7-7;

FIG. 10 illustrates a perspective view of a portion of a root assembly of a wind turbine rotor blade according to the present disclosure;

FIG. 11 illustrates an enlarged view of another embodiment of a portion of a root assembly of a wind turbine rotor blade according to the present invention;

FIG. 12 illustrates a detailed view of a portion of a root assembly of a wind turbine rotor blade according to the present disclosure;

FIG. 13 illustrates a perspective view of another embodiment of a root insert for a root assembly of a wind turbine rotor blade according to the present disclosure;

FIG. 14 illustrates a flow diagram of a method for manufacturing a root assembly for a wind turbine rotor blade according to the present disclosure;

FIG. 15 illustrates a perspective view of a shell mold used during the manufacturing process of the root assembly of a wind turbine rotor blade according to the present disclosure, particularly illustrating the outer layer placed onto the shell mold;

FIG. 16 illustrates a perspective view of a shell mold used during the manufacturing process of the root assembly of a wind turbine rotor blade according to the present disclosure, particularly illustrating the outer layer, the root inserts, and the spacers placed onto the shell mold;

FIG. 17 illustrates a perspective view of a shell mold used during the manufacturing process of the root assembly of a wind turbine rotor blade according to the present disclosure, particularly illustrating the root inserts and the spacers secured in the shell mold via a removable flange; and FIG. 18 illustrates a perspective view of a shell mold used during the manufacturing process of the root assembly of a wind turbine rotor blade according to the present disclosure, particularly illustrating the root inserts and the spacers between the inner and outer layers of composite material before infusion.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a root assembly for a rotor blade of a wind turbine and methods of manufacturing same. The root assembly includes a blade root section having an inner sidewall surface and an outer sidewall surface separated by a radial gap, a plurality of root inserts spaced circumferentially within the radial gap, and optionally a plurality of spacers configured between one or more of the root inserts. Further, the blade root section may be constructed, at least in part, from a thermoplastic material or a thermoset material. In addition, each of the root inserts includes at least one bore hole surrounded by a pre-cured or pre-consolidated composite material, e.g. a thermoplastic material or a thermoset material. Moreover, the spacers may also be constructed of a pre-cured or pre-consolidated composite material, e.g. a thermoplastic material or a thermoset material. More specifically, the thermoplastic and/or thermoset materials may be reinforced with glass or carbon fibers or rovings.

The present disclosure provides many advantages not present in the prior art. For example, the root assembly of the present disclosure provides improved laminate quality between the root inserts, e.g. due to the combination of thermoset and/or thermoplastic components. In addition, the root assembly of the present disclosure enables the use of root inserts in thermoplastic as well as thermoset rotor blades. Further, the resin consumption in the primary shell infusion process of the rotor blades may be reduced, thereby reducing overall manufacturing costs. Further, the labor required to place the root inserts and/or the spacers into the shell mold may be reduced as compared to using dry fabrics to fill the volume. Moreover, the pultruded root inserts allow for significant reductions in manufacturing cycle time as compared to using T-bolt and/or barrel nut configurations.

Referring now to the drawings, FIG. 1 illustrates a perspective view of a horizontal axis wind turbine 10. It should be appreciated that the wind turbine 10 may also be a vertical-axis wind turbine. As shown in the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes one or more rotor blades 16 coupled to and extending radially outward from the hub 18. As shown, the rotor hub 18 includes three rotor blades 16. However, in an alternative embodiment, the rotor hub 18 may include more or less than three rotor blades 16. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Referring to FIG. 2, one of the rotor blades 16 of FIG. 1 is illustrated in accordance with aspects of the present subject matter. As shown, the rotor blade 16 generally includes a root assembly 30 having a blade root section 32 that is configured to be mounted or otherwise secured to the hub 18 (FIG. 1) of the wind turbine 10. In addition, a blade tip section 34 is disposed opposite the blade root section 32. A body shell 21 of the rotor blade generally extends between the blade root section 32 and the blade tip section 34 along a longitudinal axis 24. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 36 and a suction side 38 extending between leading and trailing ends 26, 28 of the rotor blade 16. Further, the rotor blade 16 may also have a span 23 defining the total length between the blade root section 32 and the blade tip section 34 and a chord 25 defining the total length between the leading edge 26 and the trailing edge 28. As is generally understood, the chord 25 may generally vary in length with respect to the span 23 as the rotor blade 16 extends from the blade root section 32 to the blade tip section 34.

In several embodiments, the body shell 21 of the rotor blade 16 may be formed as a single, unitary component. Alternatively, the body shell 21 may be formed from a plurality of shell components or segments. Additionally, the body shell 21 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material.

The rotor blade 16 may also include one or more longitudinally extending structural components configured to provide increased stiffness, buckling resistance and/or strength to the rotor blade 16. For example, the rotor blade 16 may include a pair of longitudinally extending spar caps 20 configured to be engaged against the opposing inner surfaces of the pressure and suction sides 36, 38 of the rotor blade 16, respectively. Additionally, one or more shear webs (not shown) may be disposed between the spar caps 20 so as to form a beam-like configuration. The spar caps 20 may generally be designed to control the bending stresses and/or other loads acting on the rotor blade 16 in a generally span-wise direction (a direction parallel to the span 23 of the rotor blade 16) during operation of a wind turbine 10. Similarly, the spar caps 20 may also be designed to withstand the span-wise compression occurring during operation of the wind turbine 10.

Referring now to FIGS. 3-13 various views and/or components of multiple embodiments of the root assembly 30 according to the present disclosure are illustrated. More specifically, as shown, the root assembly 30 includes a blade root section 32 having an end face 33 with a substantially annular cross-section defined by an inner sidewall surface 40 and an outer sidewall surface 42. Further, as shown generally in the figures, the inner and outer sidewall surfaces 40, 42 are separated by a radial gap 44. In addition, in certain embodiments, the blade root section 32 may be constructed of a first composite material. For example, in certain embodiments, the first composite material may include a thermoplastic material or a thermoset material. In addition, the thermoset or thermoplastic materials of the blade root section 32 may be reinforced with one or more fibers, including but not limited to glass or carbon fibers or rovings.

In addition, as shown, the root assembly 30 also includes a plurality of root inserts 46 spaced circumferentially within the radial gap 44 and optionally a plurality of spacers 52 (FIGS. 4-6 and 8-13) configured between one or more of the root inserts 46. Moreover, each of the root inserts 46 includes at least one bore hole or bushing 48 surrounded by a second composite material 50. For example, as shown in FIGS. 3 and 4, each of the root inserts 46 includes a single bushing 48 surrounded by the second composite material 50. Alternatively, as shown in FIG. 5, one or more of the root inserts 46 may include a plurality of bushings 48 surrounded by a second composite material 50. More specifically, in certain embodiments, the bushing(s) 48 may include a metal bushing cured within and surrounded by the second composite material 50. For example, in certain embodiments, the second composite material (like the first composite material) may include a thermoplastic material or a thermoset material. In addition, as mentioned, the thermoset or thermoplastic materials may be reinforced with one or more fibers, including but not limited to glass or carbon fibers or rovings.

More specifically, in certain embodiments, the second composite material may be different than the first composite material. For example, the first composite material may be a thermoset material, whereas the second composite material may be a thermoplastic material. In alternative embodiments, the first composite material may be a thermoplastic material, whereas the second composite material may be a thermoset material. In still additional embodiments, both the first and second composite materials may be thermoplastic materials. In addition, the spacers 52 as described herein may be constructed, at least in part, of a pre-cured or pre-consolidated composite material 54, e.g. a thermoplastic material or a thermoset material.

The thermoplastic materials as described herein generally encompass a plastic material or polymer that is reversible in nature. For example, thermoplastic materials typically become pliable or moldable when heated to a certain temperature and solidify upon cooling. Further, thermoplastic materials may include amorphous thermoplastic materials and semi-crystalline thermoplastic materials. For example, some amorphous thermoplastic materials may generally include, but are not limited to styrenes, vinyls, cellulosics, polyesters, acrylics, polysulphones, and/or imides. More specifically, example amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or similar. In addition, example semi-crystalline thermoplastic materials may generally include, but are not limited to polyolefins, polyamides, fluropolymer, ethyl-methyl acrylate, polyesters, polycarbonates, and/or acetals. More specifically, example semi-crystalline thermoplastic materials may include polybutylene terephthalate (PBT), polyethylene terephthalate (PET), polypropylene, polyphenyl sulfide, polyethylene, polyamide (nylon), polyetherketone, or similar. Further, the thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, melamine formaldehyde, urea formaldehyde, or similar.

In addition, in certain embodiments, the root inserts 46 and/or the spacers 52 may be pultruded from one or more composite materials, respectively. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the composite materials may include pultrusions constructed of glass or carbon reinforced thermoset or thermoplastic materials. Further, the root inserts 46 and/or the spacers 52 may be formed of the same composite materials or different composite materials. In addition, the pultruded components may be produced from rovings, which generally encompass long and narrow bundles of fibers that are not combined until joined by a cured resin.

In particular embodiments, as shown in FIGS. 8 and 9, the spacers 52 may also include a core material 58. For example, in certain embodiments, the core material 58 may include a lightweight material such as wood (e.g., balsa), foam (e.g., extruded polystyrene foam) or a combination of such materials. More specifically, the core material 58 may include a low-density foam material. As such, the core material 58 is configured to occupy space that would otherwise fill with fiber material and/or resin during the pultrusion process. Thus, in certain embodiments, the core material 58 may be configured to fill enough space in the pultrusion spacer to allow sufficient curing throughout the spacer 52.

Referring particularly to FIGS. 6-10, the root inserts 46 and/or the spacers 52 may each include side edges 45, 53, respectively, such that when the root inserts 46 and the spacers 52 are arranged in the root assembly 30 (FIGS. 6 and 10), the side edges 45, 53 substantially align and are flush to form first and second continuous surfaces 55, 57. More specifically, the plurality of root inserts 46 may include any suitable cross-sectional shape 60. For example, as shown in FIGS. 5-8, the cross-sectional shape 60 of the root inserts 46 may be a square, a rectangle, a circle, or similar. More specifically, as shown in FIGS. 4-10, the cross-sectional shape 60 of the root inserts 46 are substantially square. Alternatively, as shown in FIGS. 11-13, the cross-sectional shape 60 of the root inserts 46 is substantially circular. In additional embodiments, the plurality of spacers 52 may also include any suitable cross-sectional shape 62. For example, as shown in FIGS. 4-10, the cross-sectional shape 62 of the spacers may correspond to the cross-sectional shape 60 of the plurality of root inserts 46 such that the inserts and spacers may be aligned together in the radial gap 44. In addition, the root inserts 46 and spacers 52 may be sized so as to follow the curvature of the radial gap 44. Alternatively, as shown in FIGS. 11-13, the cross-sectional shape 62 of the spacers 52 may include a generally hour glass shape that corresponds to the circular cross-sectional shape 60 of the root inserts 46. For example, as shown in the illustrated embodiment, the side edges 53 of the spacers 52 may be concave such that the edges receive the root inserts 46 therein.

In additional embodiments, as shown in FIG. 6, the root assembly 30 may also include a bonding agent 64 configured within the radial gap 44, e.g. between the various surfaces between the root inserts 46 and/or spacers 52. Thus, the bonding agent 64 is configured to promote surface adhesion and/or resin transfer throughout the root assembly 30 during the manufacturing process. More specifically, in particular embodiments, the bonding agent 64 may include chopped fiber mat (CFM), a biaxially-stretched plastic film, a three-dimensional glass fabric, or similar. Thus, in additional embodiments, the root assembly 30 may be formed via at least one of vacuum infusion, resin transfer molding (RTM), light resin transfer molding (RTM), vacuum assisted resin transfer molding (VARTM), or similar, which is discussed in more detail below.

Referring now to FIG. 14, a flow diagram of one embodiment of a method 100 of manufacturing a root assembly 30 for a rotor blade 16 of a wind turbine 10 is illustrated. As shown at 102, the method 100 includes placing an outer layer 42 of composite material into a shell mold 66 of a blade root section 32 of the rotor blade 16 to form an outer sidewall surface 42 of the root assembly 30, for example, as shown in FIG. 15. More specifically, the outer layer 42 of composite material may include a thermoplastic material skin that may optionally be reinforced with glass or carbon fibers. Thus, the method 100 may including laying down one or more plies (e.g. glass or carbon fibers) in the shell mold 66 that extend from the end face 33 of the blade root section 32 toward the blade tip section 34. In addition, the plies are typically laid up in the mold so as to extend from the leading edge 26 to the trailing edge 28 of the rotor blade 16. The plies may then be infused together, e.g. via a thermoplastic material. Further, as shown, the shell mold 66 may include a first shell half 68 and a second shell half (not shown). As such, the method 100 may include forming a first blade section via the first shell half 68, forming a second blade section via the second shell half, and bonding the first and second blade sections together, e.g. via an adhesive. It should be understood that each blade section may be formed via the method steps as described herein.

Thus, as shown at 104, the method 100 may also include placing a plurality of root inserts 46 atop the outer layer 42, for example, as shown in FIG. 16. In particular embodiments, as shown in FIG. 17, each root insert 46 may be placed in the mold and then bolted to a removable flange 70 which can be removed at a later time. As mentioned, the root inserts 46 may be constructed of a thermoplastic or a thermoset material. In addition, as shown at 106, the method 100 may optionally include placing a plurality of spacers 52 between one or more of the plurality of root inserts 46, for example, as shown in FIG. 16. It should be understood that the spacers 52 may be placed into the shell mold simultaneously with the root inserts 46, e.g. by alternatively placing a spacer 52, then an insert 46, and so on. For example, in certain embodiments, the method 100 may include placing at least one spacer 52 adjacent to an installed insert 46 and then subsequently placing another spacer 52 on the other side of the installed insert 46 and bolting the spacers 52 to the removable flange 70. In other words, the step of placing the plurality of root inserts 46 atop the outer layer 42 and placing the plurality of spacers 52 between one or more of the plurality of root inserts 46 may include mounting the root inserts 46 and/or the spacers 52 to the removable flange 70, which is configured to maintain the position of the root inserts 46 and/or the spacers 52 during infusing. For example, as shown, the root inserts 46 and the spacers 52 may be mounted to the removable flange via one or more fasteners 72.

It should also be understood that any arrangement of root inserts-to-spacers may be used in the root assembly 30. For example, in certain embodiments, the root assembly 30 may include only root inserts 46 as shown in FIG. 3. Alternatively, the method 100 of assembling the root assembly 30 may include varying a number of the root inserts 46 and spacers 52 based on load concentrations in the root assembly 30. More specifically, the arrangement of root inserts-to-spacers can be tailored such that the number of root inserts 46 is increased in areas of higher concentrations of load (for example, the portion of the root closest to the spar caps 20). As such, in certain embodiments, the number of root inserts 46 may be increased or decreased based on varying load concentrations in the root assembly 30. In a further embodiment, as shown in FIGS. 4, 11, and 16, the method 100 may include placing at least one spacer 52 between each of the root inserts 46 such that the root inserts 46 are evenly spaced. Such an embodiment provides equal separation of the inserts 46 to tailor the rotor blade 16 to the minimum number of bolts required without having to over design the blade root due to standard geometry of the insert 46. Alternatively, as shown in FIG. 5, the method 100 may include placing the spacers 52 between the root inserts 46 randomly.

In further embodiments, the method 100 may also include preparing one or more surfaces 45, 53 of the root inserts 46 and/or the spacers 52 (or the inner and outer sidewall surfaces 40, 42) so as to improve adhesion of the surfaces during infusion and/or to promote resin transfer during infusing. For example, in certain embodiments, the step of preparing one or more surfaces may include providing a bonding agent 64 between one or more of the surfaces, grinding one or more of the surfaces, or similar.

In addition, as mentioned, the method 100 may also include forming the root inserts 46 and/or the spacers 52 using any suitable manufacturing processes. For example, in certain embodiments, the method 100 may include pultruding the root inserts 46 and/or the spacers 52, e.g. using thermoplastic or thermoset materials reinforced with carbon or glass fibers. More specifically, in particular embodiments, the step of pultruding the spacers 52 may further include providing a low-density core material 58 to fill an internal volume of the spacers 52.

Referring still to FIG. 14, as shown at 108, the method 100 may also include placing an inner layer 40 of composite material into the shell mold 66 atop the root inserts 46 and the spacers 52 to form an inner sidewall surface 40 of the root assembly 30, for example, as shown in FIG. 18. Thus, as shown at 110, the method 100 may then include infusing the root inserts 46 and the spacers 52 between the inner and outer layers 40, 42, e.g. via a resin. More specifically, in certain embodiments, the method 100 may include infusing the root inserts 46 and the spacers 52 between the inner and outer layers 40, 42 via vacuum infusion, resin transfer molding (RTM), light resin transfer molding (RTM), vacuum assisted resin transfer molding (VARTM), or similar.

In alternative embodiments, where the inner and outer layers 40, 42 and the root inserts 46 are constructed of thermoplastic materials, the method 100 may also include welding the thermoplastic inserts 46 between the inner and outer layers 40, 42 (rather than including or bonding the inserts 46 between the inner and outer layers 40, 42). As such, the thermoplastic inserts 46 may be reheated, removed, and replaced in the event of damage and/or manufacturing defects. More specifically, in certain embodiments, the method 100 may include heating the metal bushing 48 of the inserts 46 such that the surrounding thermoplastic material is heated. Thus, the heated thermoplastic material can be welded to surrounding thermoplastic mating surfaces, e.g. the inner and outer layers 40, 42. In additional embodiments, pressure may also be applied from the root end of the metal bushing 48 to ensure a suitable weld bond. Accordingly, in further embodiments, a similar process may be used to remove an existing insert 46, i.e. by applying heat to the metal bushing 48 while pulling on the insert 46 to be removed.

The process for infusing, bonding, or welding the inserts 46 between the inner and outer layers 40, 42 can then be repeated for each blade half (if necessary). Further, the blade halves (where first and second shell molds are used) are allowed to cure for a predetermined time period. Once cured, the removable flange 70 may be removed and reused to manufacture additional root assemblies 30. In addition, the blade halves (if applicable) may be bonded together, e.g. with an adhesive, to form the root assembly 30. The adhesive is then allowed to cure to a state suitable for ejecting the root assembly 30 from the shell molds. The root assembly 30 may then be ejected from the shell mold 66 and located to an area for finishing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A root assembly for a rotor blade of a wind turbine, comprising:
a blade root section comprising an inner sidewall surface and an outer sidewall surface separated by a radial gap, the blade root section constructed of a first composite material, the first composite material comprising a thermoplastic material;
a plurality of root inserts spaced circumferentially within the radial gap, each of the root inserts comprising at least one bushing cured within and surrounded by a second composite material formed primarily of a thermoset material, each of the bushings configured to receive a root bolt, the root bolts configured to secure the root assembly to a hub of the wind turbine; and,
a plurality of spacers configured between one or more of the root inserts, each of the spacers being constructed of a pre-consolidated composite material.

2. The root assembly of claim 1, wherein the thermoplastic material comprises at least one of polyvinyl chlorides (PVC), polyvinylidene chlorides, polyvinyl acetates, polypropylenes, polyethylenes, polystyrenes, polyurethanes, polyphenyl sulfide, polybutylene terephthalate (PBT), polyamides, polymethyl methacrylate (PMMA),glycolised polyethylene terephthalate (PET-G), or polyethylene terephthalate (PET).

3. The root assembly of claim 1, wherein the thermoset material comprises at least one of polyester, ester, epoxy, polyurethane, melamine formaldehyde, or urea formaldehyde.

4. The root assembly of claim 1, wherein the plurality of spacers are constructed, at least in part, of a thermoplastic material or a thermoset material.

5. The root assembly of claim 1, wherein at least one of the thermoset material or the thermoplastic material is reinforced with one or more fibers.

6. The root assembly of claim 5, wherein the one or more fibers comprise at least one of carbon fibers, carbon rovings, glass fibers, or glass rovings.

7. The root assembly of claim 1, further comprising a bonding agent configured within the radial gap, the bonding agent comprising chopped fiber mat (CFM), a biaxially-stretched plastic film, or a three-dimensional glass fabric.

8. A root assembly for a rotor blade of a wind turbine, comprising:
a blade root section comprising an inner sidewall surface and an outer sidewall surface, the inner and outer sidewall surfaces being separated by a radial gap, the blade root section constructed, at least in part, of a first thermoplastic resin;
a plurality of root inserts spaced circumferentially within the radial gap, each of the root inserts comprising at least one bushing cured within and surrounded primarily by a second thermoplastic resin, each of the bushings configured to receive a root bolt, the root bolts configured to secure the root assembly to a hub of the wind turbine, the first and second thermoplastic resins being different; and,
a plurality of spacers configured between one or more of the root inserts, each of the spacers being constructed of a pre-consolidated composite material.

9. The root assembly of claim 8, wherein at least one of the first thermoplastic resin or the second thermoplastic resin is reinforced with one or more fibers, wherein the one or more fibers comprise at least one of carbon fibers or rovings or glass fibers or rovings.

10. A root assembly for a rotor blade of a wind turbine, comprising:
a blade root section comprising an inner sidewall surface and an outer sidewall surface, the inner and outer sidewall surfaces being separated by a radial gap, the blade root section constructed of a thermoset material;
a plurality of root inserts spaced circumferentially within the radial gap, each of the root inserts comprising at least one bushing solidified within and surrounded primarily by a thermoplastic material, each of the bushings configured to receive a root bolt, the root bolts configured to secure the root assembly to a hub of the wind turbine; and,
a plurality of spacers configured between one or more of the root inserts, each of the spacers being constructed of a pre-consolidated composite material.

11. The root assembly of claim 10, wherein the thermoplastic material comprises at least one of polyvinyl chlorides (PVC), polyvinylidene chlorides, polyvinyl acetates, polypropylenes, polyethylenes, polystyrenes, polyurethanes, polyphenyl sulfide, polybutylene terephthalate (PBT), polyamides, polymethyl methacrylate (PMMA), glycolised polyethylene terephthalate (PET-G), or polyethylene terephthalate PET).

12. The root assembly of claim 10, wherein the thermoset material comprises at least one of polyester, ester, epoxy, polyurethane, melamine formaldehyde, or urea formaldehyde.

13. The root assembly of claim 10, wherein the plurality of spacers are constructed, at least in part, of a thermoplastic material or a thermoset material.

14. The root assembly of claim 10, wherein at least one of the thermoset material or the thermoplastic material is reinforced with one or more fibers.

15. The root assembly of claim 14, wherein the one or more fibers comprise at least one of carbon fibers, carbon rovings, glass fibers, or glass rovings.

16. The root assembly of claim 10, further comprising a bonding agent configured within the radial gap, the bonding agent comprising chopped fiber mat (CFM), a biaxially-stretched plastic film, or a three-dimensional glass fabric.

* * * * *